(12) United States Patent
Yamagishi

(10) Patent No.: US 12,271,641 B2
(45) Date of Patent: Apr. 8, 2025

(54) INFORMATION PROCESSING APPARATUS AND NON-TRANSITORY COMPUTER READABLE MEDIUM THAT PROVIDE MULTI-FACTOR AUTHENTICATION

(71) Applicant: FUJIFILM Business Innovation Corp., Tokyo (JP)

(72) Inventor: Hiroki Yamagishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 452 days.

(21) Appl. No.: 17/224,129

(22) Filed: Apr. 7, 2021

(65) Prior Publication Data

US 2022/0083292 A1    Mar. 17, 2022

(30) Foreign Application Priority Data

Sep. 17, 2020  (JP) ................................ 2020-156359

(51) Int. Cl.
   *G06F 3/12*     (2006.01)
   *G06F 21/31*    (2013.01)
   *G06F 21/60*    (2013.01)
   *H04N 1/00*     (2006.01)

(52) U.S. Cl.
   CPC .......... *G06F 3/1222* (2013.01); *G06F 3/1238* (2013.01); *G06F 21/31* (2013.01); *G06F 21/608* (2013.01); *H04N 1/00854* (2013.01); *G06F 3/1287* (2013.01)

(58) Field of Classification Search
   CPC ...... G06F 3/1222; G06F 3/1238; G06F 21/31; G06F 21/608; G06F 3/1287; G06F 3/1267; G06F 3/1285; G06F 21/32; H04N 1/00854

USPC ................................................ 358/1.14, 1.15
See application file for complete search history.

(56) References Cited

U.S. PATENT DOCUMENTS

| | | | |
|---|---|---|---|
| 2012/0069386 A1* | 3/2012 | St. Laurent | G06F 3/1292 358/1.15 |
| 2013/0070288 A1* | 3/2013 | Muranaka | G06F 3/1204 358/1.15 |
| 2014/0002859 A1* | 1/2014 | Isoda | H04N 1/00225 358/1.15 |
| 2020/0183628 A1* | 6/2020 | Boo | G06F 3/1238 |

FOREIGN PATENT DOCUMENTS

| | | |
|---|---|---|
| JP | 2012065254 | 3/2012 |
| JP | 2019-155610 | 9/2019 |

OTHER PUBLICATIONS

"Office Action of Japan Counterpart Application", issued on May 14, 2024, with English translation thereof, p. 1-p. 5.

* cited by examiner

*Primary Examiner* — Kent Yip
(74) *Attorney, Agent, or Firm* — JCIPRNET

(57) ABSTRACT

An information processing apparatus includes a processor configured to: perform a first authentication process to authenticate a user; and if a job is stored on a second accumulator having a higher security level than a first accumulator by the user authenticated via the first authentication process, perform as an additional authentication process a second authentication process different from the first authentication process.

18 Claims, 9 Drawing Sheets

INFORMATION PROCESSING APPARATUS AND NON-TRANSITORY COMPUTER READABLE MEDIUM THAT PROVIDE MULTI-FACTOR AUTHENTICATION

CROSS-REFERENCE TO RELATED APPLICATIONS

This application is based on and claims priority under 35 USC 119 from Japanese Patent. Application No. 2020-156359 filed Sep. 17, 2020.

BACKGROUND

(i) Technical Field

The present disclosure relates to the information processing apparatus and a non-transitory computer readable medium.

(ii) Related Art

A two-factor authentication system of the related art controls unauthorized use of an authentication function on print data. To this end, the two-factor authentication system performs an authentication process using identity (ID) and password and an authentication process using a one-time password. For example, Japanese Unexamined Patent Application Publication No. 2019-155610 discloses an image forming apparatus that performs two-factor authentication. The disclosed image forming apparatus includes a first authenticator, second authenticator, printer, and determiner. The first authenticator accepts user authentication via a first factor. The second authenticator accepts user authentication via a second factor. The printer prints print data. The determiner determines whether the print data is stored on a first data server connected to a first network or a second data server connected to a second network that is at a security level higher than the first network. If the determiner determines that the print data is stored on the second data server, the image forming apparatus allows the printer to print the print data through the user authentication via the first factor and the user authentication via the second factor.

If the print data is stored on the second data server, two-factor authentication is performed thus securing higher security than one-factor authentication alone. However, when the image forming apparatus, such as a printer, performs a job, such as printing print data, jobs are offered as execution targets to a user for selection. If the jobs are presented by means of job names to the user without securing security, a portion of a job, such as the name of the job, is verified by the user and the portion of the job that is to be security protected is offered to the user. There is some room for improvement in securing security on the job.

SUMMARY

Aspects of non-limiting embodiments of the present disclosure relate to an information processing apparatus and non-transitory computer readable medium securing security while reducing workload on a user in comparison with when information on a job is displayed at the phase of job selection.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: perform a first authentication process to authenticate a user; and if a job is stored on a second accumulator having a higher security level than a first accumulator by the user authenticated via the first authentication process, perform as an additional authentication process a second authentication process different from the first authentication process.

BRIEF DESCRIPTION OF THE DRAWINGS

Exemplary embodiments of the present disclosure will be described in detail based on the following figures, wherein.

DETAILED DESCRIPTION

Figure 1:
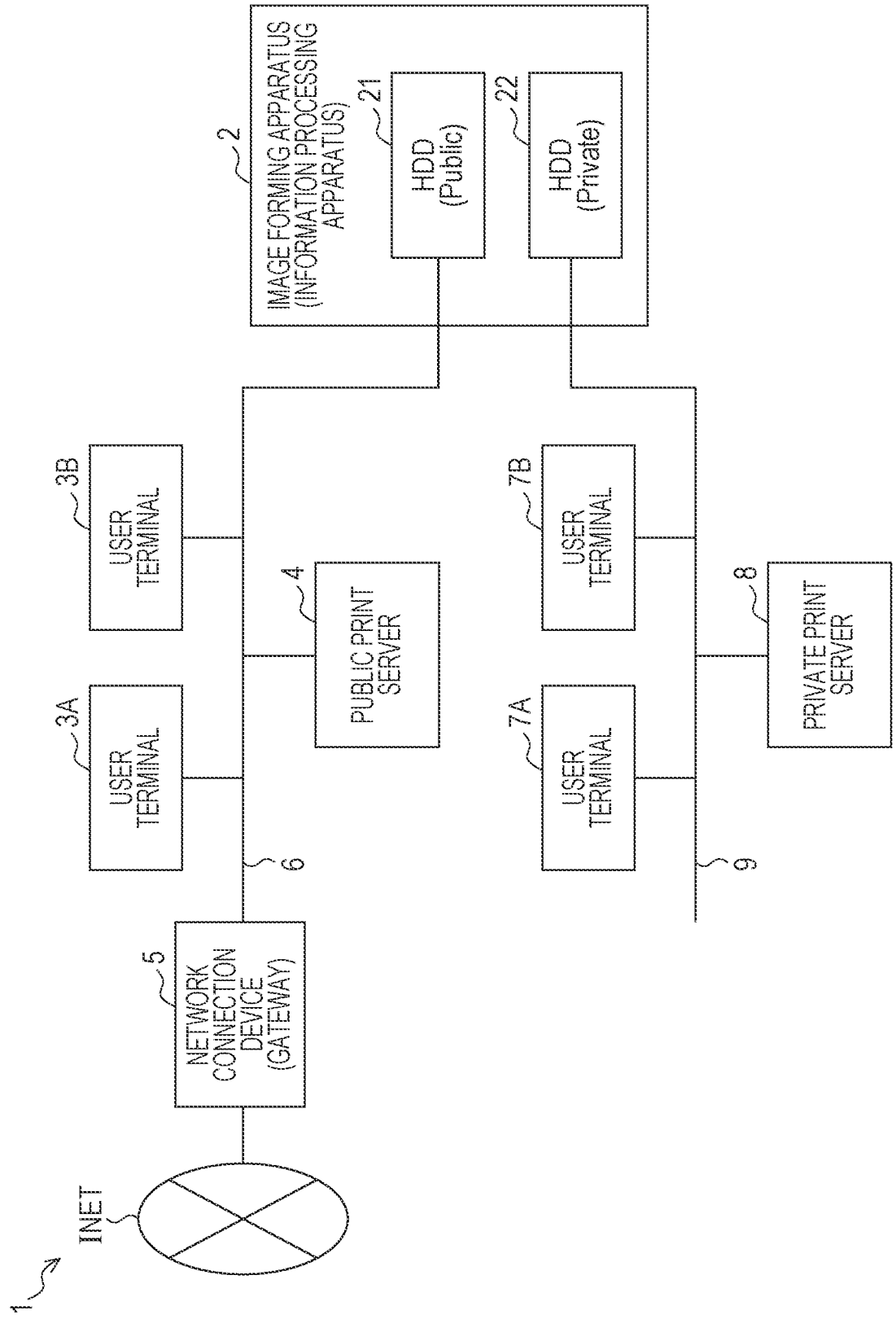
FIG. 1 illustrates a configuration of a network system of an exemplary embodiment.

Exemplary embodiments that embody a technique of the disclosure are described below with reference to the drawings. Elements and processes responsible for the same operation and unction are designated with the same reference numeral and the description thereof is not duplicated. Each drawing is detailed enough to roughly understand the exemplary embodiments. The technique of the disclosure is not limited to examples in the drawings. Configuration not directly linked to the disclosure and well-known configuration may not necessarily be described.

The term "security" in the disclosure is a concept including protecting an electronic device handling data, such as a memory storing data and a communication path that communicates data. The protection herein controls leakage of at least part of data to outside. The security level relates to information that involves a higher degree of protection as a security level increases. Concerning the same authentication process or at least one of authentication processes, the security level increases as the number of authentication cycles increases.

The security level refers to information that defines a scope of actions that an administrator permits a user to take. For example, the security level refers to information that defines installation or deletion of an application program and restrictions and permission on the user who modifies or stores data or file. The administrator in this case is a specific user who sets a security policy on data or a network and operates in accordance with the security policy.

The term "biometric authentication" is an example of authentication. The biometric authentication is a concept of authentication in which physical characteristics are detected and each user is authenticated using the biometric information resulting from the detection of the physical characteristics. The biometric information is about a portion of a human body, such as face, fingerprint, iris, vein and the like, action characteristic of a portion of the body, and a whole-body shape and action characteristic of the whole-body shape.

According to the exemplary embodiment, the term "job" is a concept that includes a data group including data and information related to the data. An example of the information related to the data includes attribute information related to the data and process information indicating a process performed on the data by a processor in response to an instruction from a user. Examples of the are a print job and a scan job.

First Exemplary Embodiment

FIG. 1 illustrates a configuration of a network system 1 of a first exemplary embodiment of the disclosure.

Referring to FIG. 1, the network system 1 includes an image forming apparatus 2 as an information processing apparatus. A public network 6 and private network 9 are respectively connected to the image forming apparatus 2. Each of the public network 6 and the private network 9 is implemented as an internal network, such as intranet. The private network 9 has a security level higher than the public network 6.

The public network 6 is connected to via a network connection device 5 serving as a gateway and including a function as a firewall a public network, such as the Internet, and an external network INET including, an external communication network.

The public network 6 connects to user terminals 3A and 3B and public print server 4.

The private network 9 connects to user terminals 7A and 7B and private print server 8.

The user terminal 3A and 3B, public print server 4, and image forming apparatus 2 connected to the public network 6 are interconnected to each other via the public network 6 for data communication. The user terminals 7A and 7B, private print server 8, and image forming apparatus 2 are interconnected to each other via the private network 9 for data communication.

The image forming apparatus 2 includes a first accumulator 21, such as a hard disk drive (HEAD) storing data on the pubic network 6 and a second accumulator 22, such as a HDD storing data on the private network 9. The first accumulator 21 and second accumulator 22 store data from mutually independent networks.

Referring to FIG. 1, the user terminals 3A and 3D are connected to the pubic network 6 and the user terminal 7A and 7B are connected to the private network 9. Two user terminals are thus connected to each network. According to the exemplary embodiment, the number of user terminals connected to each network is not limited to two. At least one user terminal is connected to each network. The user terminals 3A and 3B and the user terminals 7A and 7B are not individually described. To describe features common to the user terminals on the network, a user terminal 3 and a user terminal 7 on respective networks may be representatively described.

The network connection device 5 has a communication control function that controls data communication. One example of the communication control function includes restricting (for example, blocking) the data communication between the public network 6 and the external network INET to a predetermined connection destination. The data communication restriction or the network connection device 5 restricts (or blocks) the communication between each the image forming apparatus 2, user terminals 3A and 3B, and public print server 4 connected to the public network 6 and the external network INET.

Unlike the public network 6, the private network 9 is not connected to the external network INET. The private network 9 is implemented in a secure network environment that permits data communication between predetermined devices connected to the private network 9. Specifically, the private network 9 has a security level higher than the public network 6.

The public print server 4 and the first accumulator 21 are an example of a first accumulator of the disclosure. The second accumulator 22 and the private print server 8 are an example of a second accumulator of the disclosure.

Image Forming Apparatus

Figure 2:
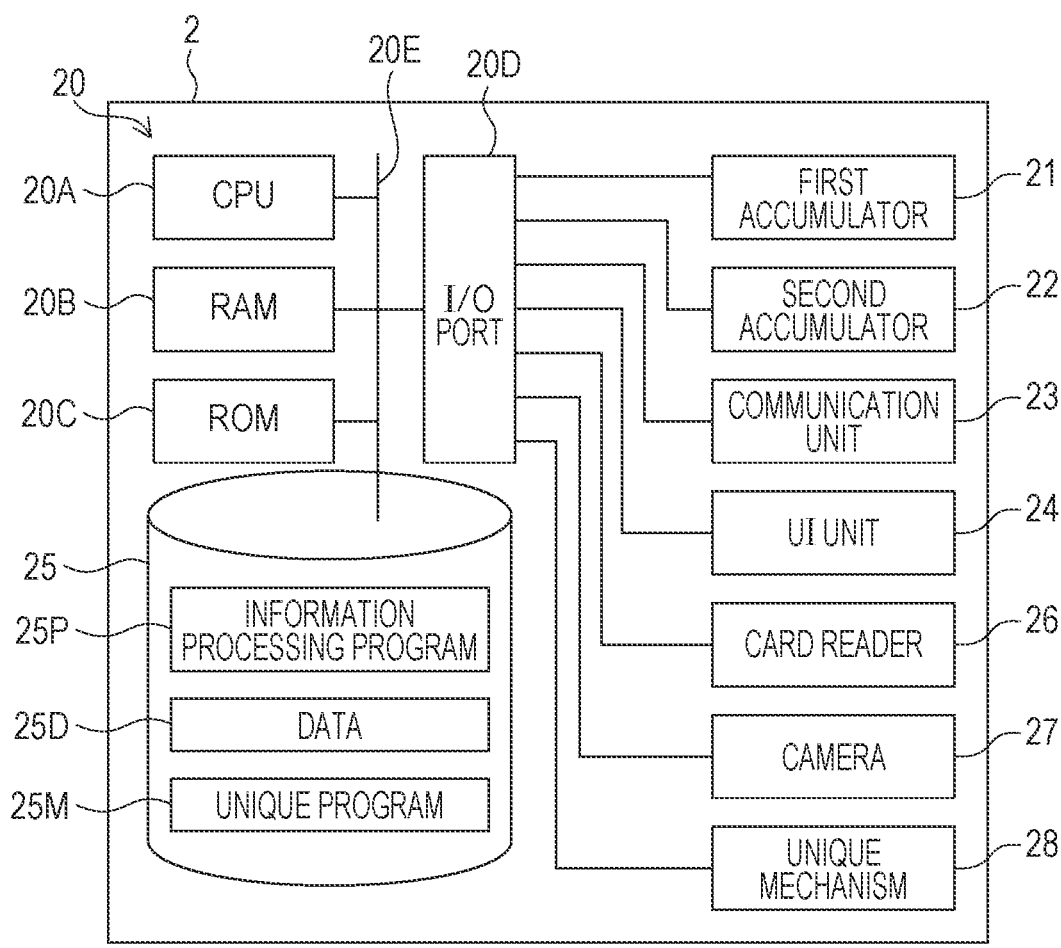
FIG. 2 is a block diagram of an electrical configuration example of an image forming apparatus of the exemplary embodiment.

An example of a configuration of the image forming apparatus 2 is described with reference to FIG. 2. FIG. 2 is an electrical block diagram of the image forming apparatus 2 of the exemplary embodiment.

The image forming apparatus 2 includes a computer 20. The computer 20 includes a central processing unit (CPU) 20A, random-access memory (RAM) 20B, read-only memory (ROM) 20C, input and output (I/O) port 20D, and bus 20E that interconnects these elements. The bus 205 connects to an additional memory device 25 that is implemented by an HDD or non-volatile flash memory.

The I/O port 20D connects to the first accumulator 21 storing data used on the public network 6 and the second accumulator 22 storing data used on the private network 9. The first accumulator 21 may store a print job including print data responsive to the print instruction provided to the image forming apparatus 2 by the user terminal 3 connected to the public network 6. The second accumulator 22 may store a print job including print data responsive to the print instruction provided to the image forming apparatus 2 by the user terminal 7 connected to the private network 9.

The I/O port 20D further connects to a communication unit 23 and a user interface (UI) unit 24. The UI unit 24, such as a touch panel, displays an image while receiving an operation.

The I/O port 20D also connects to a card reader 26 and camera 27, unit each used for an authentication process. The card reader 26 is a first sensor used to authenticate a user via a first authentication process. The camera 27 is a second sensor used to authenticate the user via a second authentication process different from the first authentication process.

According to the first exemplary embodiment, the first authentication process is an identification (ID) card authentication process that authenticates the user via an ID card held by the user. The card reader 26 as the first sensor based on the first authentication process retrieves information on the ID card. In accordance with the first authentication process, namely, the ID card authentication process, authentication information is retrieved from the ID card that registers the authentication information, such as an ID and password. The retrieved authentication information is checked against pre-registered authentication information to determine whether the user is successfully authenticated or not. The first authentication process is not limited to the ID card authentication process and may be any method as long as the user is identified. For example, the first authentication process may use the ID and password.

According to the exemplary embodiment, a biometric authentication process is used as the second authentication process. A camera as the second sensor operating in the second authentication process acquires a face image as information indicating physical characteristics different from user to user. In the second authentication process, namely, a face authentication process, the face of a user is photographed, biometric information indicating feature points of the face and feature lines connecting the feature points are extracted from an photograph image, and the extracted authentication information is checked against pre-stored authentication information to determine whether the user is successfully authenticated or not. The second authentication process is not limited to the face authentication process and may be any authentication process as long as it is different from the first authentication process to identify the user. For example, other examples of the biometric authentication process include authentication process that uses biometric information on a portion of the user body, such as fingerprint, iris, or vein. The second authentication process may typically have a higher security level than the first authentication process.

The image forming apparatus 2 includes a unique mechanism 28 that implements an image processing function. Specifically, the image processing function includes an image copy function to copy a document, an image forming function, such as an image print function to print data of the document, and an image reading function to read (scan) the document as data. The unique mechanism 28 may be a scanner to scan the document and a printer to print a variety of data.

The additional memory 25 stores the information processing program 25P that causes the image forming apparatus 2 to function as an information processing apparatus of the disclosure. The CPU 20A performs a process thereof by, retrieving the information processing program 25P from the additional memory 25 and expanding the information processing program 25P onto the RAM 20B. The image forming apparatus 2 having executed the information processing program 25P has functioned as the information processing apparatus of the disclosure. It is noted that the information processing program 25P includes an authentication process to perform authentication via the first authentication process and the second authentication process. The information processing program 25P may be supplied in a recorded form on a compact disk read-only memory (CD-ROM).

The additional memory 25 also stores a variety of data 25D to be used on the image forming apparatus 2. The additional memory 25 also stores a unique program 25M used to implement an image processing function on the image forming apparatus 2. The CPU 20A performs the process thereof by retrieving the unique program 25M from the additional memory 25 and expanding the unique program 25M onto the RAM 20B. The image forming apparatus 2 having executed the unique program 25M have executed the image forming function and the image processing function including the image reading function.

Figure 3:
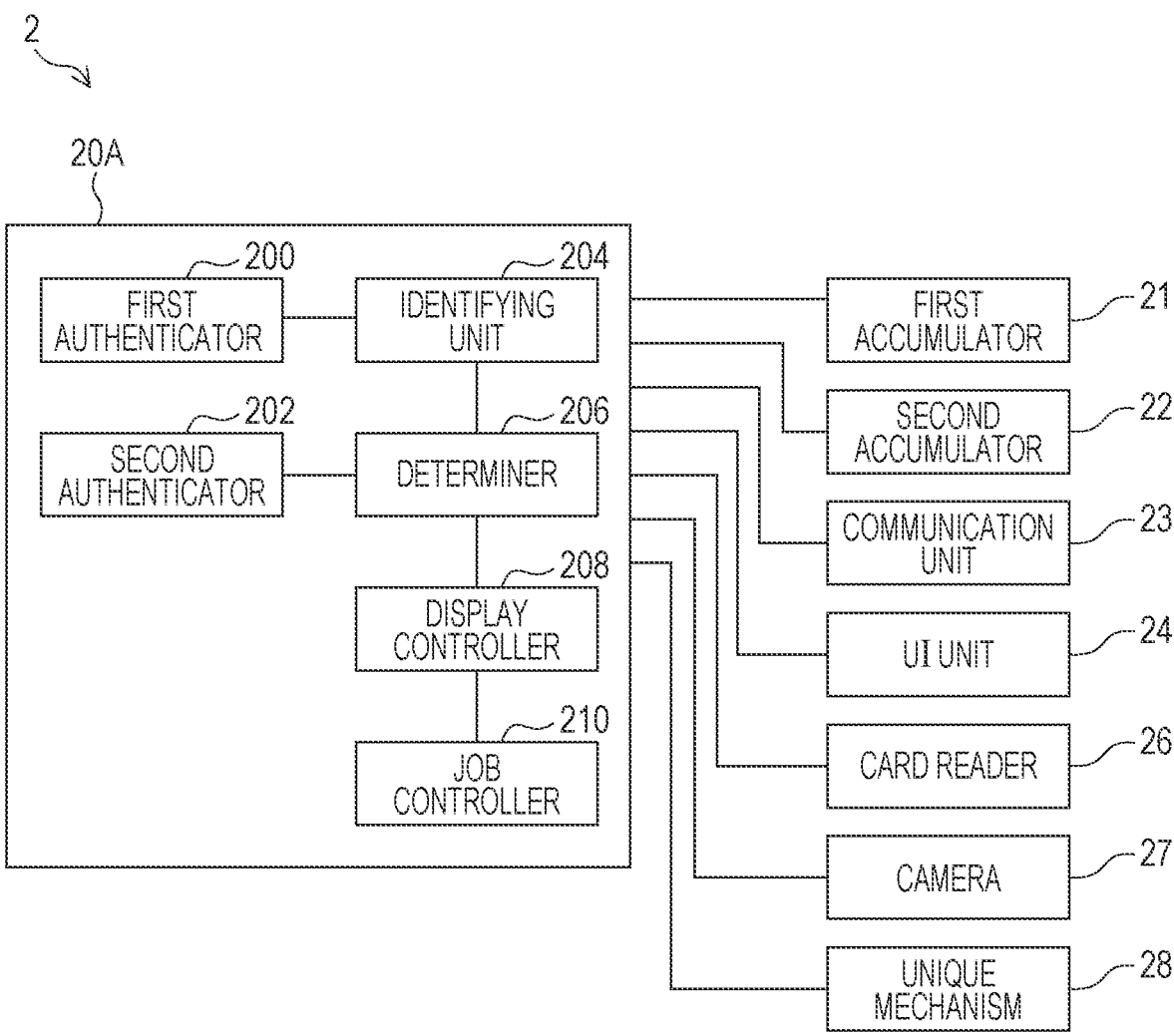
FIG. 3 is a block diagram of a functional configuration example of the image forming apparatus of the exemplary embodiment.

FIG. 3 is a functional block diagram of the image forming apparatus 2 of the first exemplary embodiment.

Referring to FIG. 3, the CPU 20A in the image forming apparatus 2 of the first exemplary embodiment functions as the information processing apparatus by executing the information processing program 25P. The information processing apparatus includes a first authenticator 200, second authenticator 202, identifying unit 204, determiner 206, display controller 208, and job controller 210.

The first authenticator 200 authenticates a user via the first authentication process, namely, via an ID card authentication process. It is noted that an ID and password are pre-registered on the first authenticator 200 as reference authentication information to authenticate the user via the first authentication process. The first authenticator 200 thus acquires the authentication information, such as the ID and password, from the ID card held by the user by using the card reader 26 as the first sensor, and checks the acquired authentication information against the pre-registered reference authentication information to determine whether to authenticate the user.

The second authenticator 202 authenticates the user via the second authentication process different from the first authentication process, namely, via a face authentication process. It is noted that biometric information on each user pre-registered on the second authenticator 202 as the reference authentication information used to authenticate the user via the face authentication process. The second authenticator 202 extracts from the face image of the user photographed by the camera 27 as the second sensor the biometric information as the authentication information indicating feature points of the face of the user and feature lines connecting the feature points, and checks the extracted authentication information against the pre-registered reference authentication information to determine whether the user successfully authenticated.

The identifying unit 204 instructs the first authenticator 200 or the second authenticator 202 to perform authentication. If a user has been successfully authenticated, the identifying unit 204 identifies that user.

The determiner 206 determines whether a print job of the user identified by the identifying unit 204 is stored on the second accumulator 22. The determiner 206 instructs the second authenticator 202 to perform additional authentication in response to determination results and determines whether the additional authentication has been successful. Specifically, if the print job of the identified user is stored on the second accumulator 22 and the performed authentication is based on the first authentication process, the determiner 206 instructs the second authenticator 202 to perform the additional authentication. If the performed authentication is based on the second authentication process, the instruction causing the second authenticator 202 to perform the additional authentication is omitted.

The display controller 208 performs control to display on the UI unit 24 the print jobs stored on the first accumulator 21 and the second accumulator 22 in response to the determination results of the determiner 206. Specifically, if the determiner 206 determinates that the print job of the user is not stored on the second accumulator 22, the display controller 208 performs control to display the print job stored on the first accumulator 21 on the UI unit 24 in a manner such that the print job is selectable.

On the other hand, if the determiner 206 determines that the print job of the user is stored on the second accumulator 22, the display controller 208 performs display control in response to the success or failure of the additional authentication via the second authentication process. Specifically, if the print job of the user is stored on the second accumulator 22 and the additional authentication via the second authentication process is determined to be successful, the display controller 208 performs control such that the print job stored on the first accumulator 21 and the print stored on the second accumulator 22 are displayed on the UI unit 24 in a manner such that the print jobs are selectable. If the print job of the user is stored on the second accumulator 22 and the additional authentication via the second authentication process is determined to be unsuccessful, the display controller 208 performs control such that only the print job stored on the first accumulator 21 is displayed on the UI unit 24 but does not perform control to display the print job stored on the second accumulator 22 on the UI unit 24.

The job controller 210 performs control to process the print job that is displayed in response to the selection instruction from the display controller 208.

A determination as to whether to perform the additional authentication via the second authentication process is made depending on whether the print job is stored on the second accumulator 22 higher in security level than the first accumulator 21. The workload on the user may be reduced and security may be secured in comparison with when the information on the print job is displayed at the phase of selecting the print job.

The first authenticator 200 is an example of a function unit that performs the first authentication process of the disclosure. The second authenticator 202 is an example of a function that performs the second authentication process of the disclosure.

User Terminal

Figure 4:
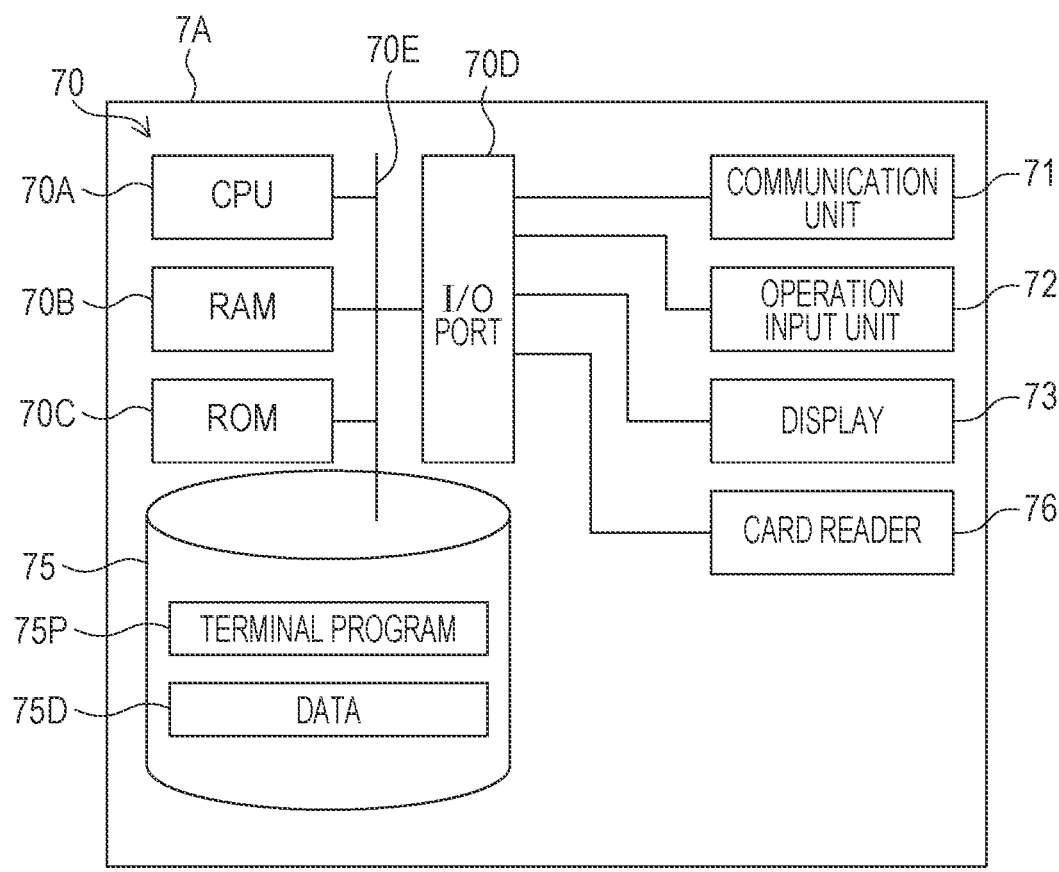
FIG. 4 is a block diagram of a configuration example of a user terminal of the exemplary embodiment.

The user terminal 7A is described with reference to FIG. 4. The user terminal 7A is a terminal that the user operates to perform the print job via the private network 9. The user terminal 7A may be a general-purpose computer, such as a personal computer (PC).

The user terminal 7A includes a computer 70. The computer 70 includes a CPU 70A, RPM 70B, ROM 70C, I/O port 70D, and bus 70E connecting these elements. The bus 70E connects to an additional memory 75 that is an HDD or non-volatile flash memory. The I/O port 70D also connects to a communication unit 71 that communicates with the outside, an operation input unit 72 that the user uses to verify displays and input an operation, and a display 73.

The additional memory 75 stores a terminal program 75P. The user terminal 7A retrieves the terminal program 75P from the additional memory 75 and expands the terminal program 75P onto the RAM 70B to perform a process. The user terminal 7A having performed the terminal program 75P has operated as an apparatus that provides a print job instruction.

The additional memory 75 stores a variety of data 75D to be used on the user terminal 7A.

The data 75D is connectable to a card reader 76. The card reader 76 is used in an authentication process to authenticate a user who is eligible to operate the user terminal 7A. If only a predetermined person is eligible to operate the user terminal 7A, the card reader 76 is not used. To increase the authentication level of the users eligible to operate the user terminal 7A, a camera may be connected to authenticate the user via an authentication process, such as a face authentication process.

The user terminal 7B is identical in configuration to the user terminal 7A and the discussion thereof is omitted herein. The user terminals 3A and 3B are substantially identical in configuration to the user terminal 7A. Since the user terminals 3A and 3B are connected to the public network 6, they are without a device, such as the card reader 76, used to authenticate the user.

Print Server

Figure 5:
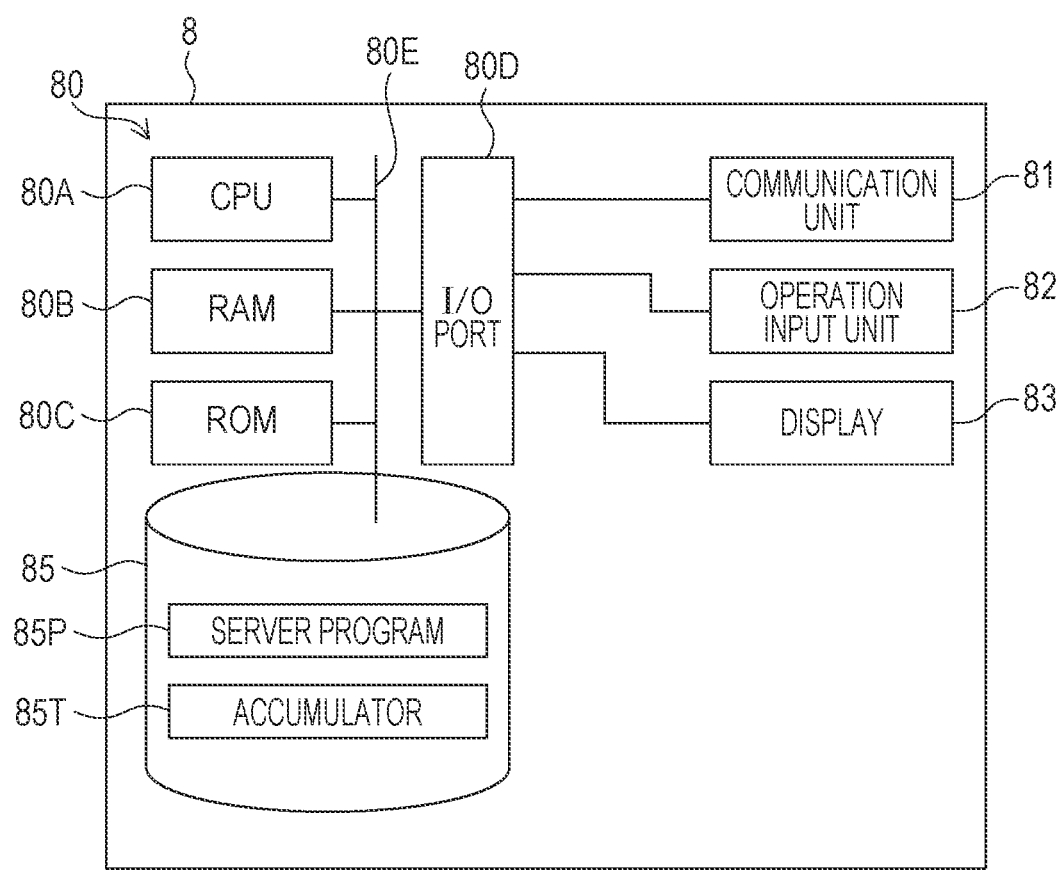
FIG. 5 is a block diagram of a configuration example of a private print server of the exemplary embodiment.

Referring to FIG. 5, an example of the configuration of the private print server 8 is described below.

The private print server 8 is connected to the private network 9 and stores a pint job from the user terminal 7A via the private network 9. The private print server 8 includes a computer 80. The computer 80 includes a CPU 80A, RAM 80E, ROM 80C, and I/O port 80D. These elements are interconnected to each other via a bus 80E. The bus 80E connects to an additional memory 85 that may be an HDD or non-volatile flash memory. The I/O port 80D also connects to a communication unit 81 that communicates with a device on the private network 9, an operation input unit 82 that receives an operation from the user, and a display 83.

The additional memory 85 may store the server program 85P. The private print server 8 performs a process thereof by retrieving the server program 85P from the additional memory 85 and expanding the additional memory 85 onto the RAM 80B. The additional memory 85 includes a accumulator 85T that stores a print job specified by the user terminal 7A. The private print server 8 having executed the additional memory 85 thus has operated as a device that stores the print job from the user terminal 7 onto the accumulator 85T.

The private print server 8 stores the print job from the user terminal 7 onto the accumulator 85T and transmits the stored print to the image forming apparatus 2 via the communication unit 81 and the private network 9.

A card reader (not illustrated) is connectable to the I/O port 80D. The card reader is used in the authentication process to authenticate the user eligible to operate the user terminal 7A. If only a predetermine person is eligible to operate the user terminal 7A, the card reader is not used. To increase the authentication level of the users eligible to operate the user terminal 7A, a camera may be connected to authenticate the user via an authentication process, such as a face authentication process.

The public print server 4 is connected to the public network 6 and stores a print from the user terminal 3A via the public network 6. The difference between the public print server 4 and the private print server 8 is that the public print server 4 is connected to the public network 6. Since the public print server 4 is identical in configuration to the private print server 8, the discussion of the public print server 4 is omitted herein.

Function of Network System

A network system 1 of the first exemplary embodiment is descried below.

The user provides an instruction to perform a print job after performing the authentication process using the user terminal 3A (FIG. 1). The user terminal 3A transmits to the public print server 4 via the public network 6 the print job responsive to an execution instruction from the user. The print job is thus stored on the public print server 4. The public print server 4 transmits the print job to the image forming apparatus 2 via the public network 6. The print job is thus stored on the first accumulator 21 in the image forming apparatus 2 connected via the public network 6.

The user may perform the print 1 in response to the instruction the user provides using the user terminal 3A. In this process, the user performs the print by selecting the print job responsive to the print instruction on the image forming apparatus 2 after the authentication process.

On the other hand, the user may provide the instruction to perform the print job via the private network 9 by operating the user terminal 7A. In this case, the print job is stored on the private print server 8 higher in security level than the public print server 4. The private print server 8 transmits the stored print job to the image forming apparatus 2 via the private network 9. The print job is thus stored on the second accumulator 22 in the image forming apparatus 2 connected via the private network 9. The second accumulator 22 is set to be higher in security level than the first accumulator 21.

The user may perform the print job in response to the instruction the user provides using the user terminal 7A. In this process, the user per form the print job by selecting the print job responsive to the print instruction on the image forming apparatus 2 after the authentication process.

Information Processing Program

Information processing performed by the image forming apparatus 2 is described below.

It is noted herein that the reference authentication information, such as the ID and password, used to authenticate the user via the first authentication process, namely, the card authentication process, is pre-registered on the image forming apparatus 2. It is also noted that the reference authentication information, such as the ID and password, used to authenticate the user via the second authentication process, namely, the face authentication process, different from the first authentication process, is pre-registered on the image forming apparatus 2. The print job responsive to the print instruction provided by the user terminal 7A is stored on the accumulator 85T in the private print server 8. The print job responsive to the print instruction provided by the user terminal 3A is stored on the accumulator in the public print server 4.

Figure 6:
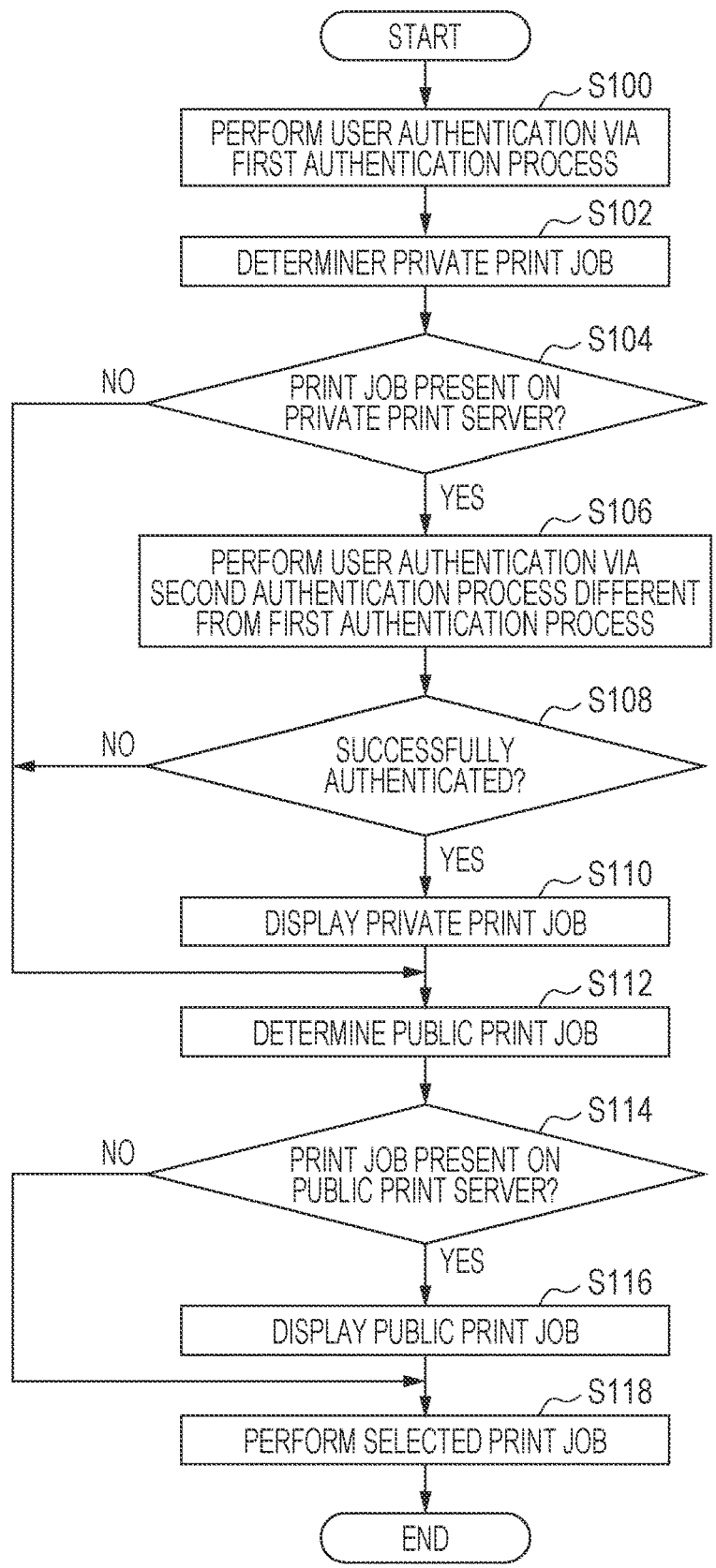
FIG. 6 is a flowchart illustrating an information process example performed by the image forming apparatus of the exemplary embodiment.

FIG. 6 is a flowchart illustrating an information processing process performed by the image forming apparatus 2 of the first exemplary embodiment. The process routine in FIG. 6 is an example of the process of the information processing program 25P stored on the image forming apparatus 2. The process routine in FIG. 6 is executed by the CPU 20A in the image forming apparatus 2.

In step S100, the CPU 20A performs the user authentication via the first authentication process. The CPU 20A first acquires the ID and password as the authentication information for the card authentication by using the card reader 26. The CPU 20A performs the user authentication by checking the ID and password as the acquired authentication information against the ID and password as the pre-registered reference authentication information. If the acquired authentication information matches the reference authentication information, the CPU 20A determines that the authentication is successful the acquired authentication information fails to match the reference authentication information, the CPU 20A determines that the authentication is unsuccessful. In the case of the successful authentication, the CPU 20A identifies the user authenticated via the first authentication process. Specifically, the CPU 20A stores the ID of the authenticated user and proceeds to step S102.

In the case of the unsuccessful authentication, the user is not eligible to use the image forming apparatus 2 and the process routine ends. In such a case, information indicating an unregistered user may be displayed on the UI unit 24. By displaying the information indicating the unregistered user, the unregistered user who has attempted to be authenticated is notified that he or she has been unregistered and thus has not successfully been authenticated.

As described above, in step S100, the user authentication is performed via the first authentication process. Alternatively, the user authentication may be performed via the second authentication process. The operation in step S100 is an example of function performed by the first authenticator 200, second authenticator 202, and identifying unit 204 illustrated in FIG. 3.

In step S102, the CPU 20A performs a private print job determination. Specifically, the CPU 20A determines whether the print job linked with the user authenticated in step S100 is stored on the private print server 8.

Figure 7:
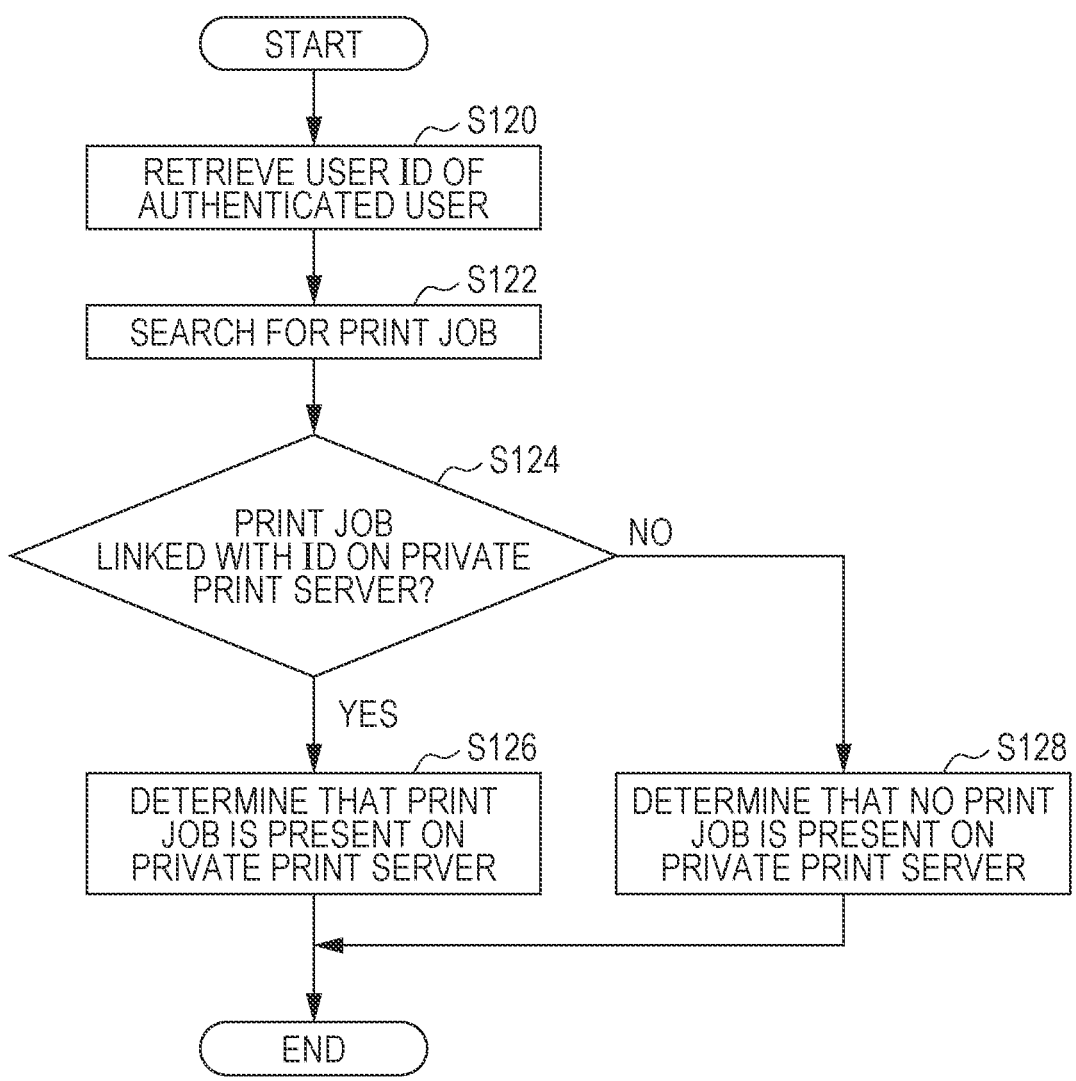
FIG. 7 is a flowchart illustrating an example of a private print job determination process of the exemplary embodiment.

FIG. 7 is a flowchart illustrating the private print job determination performed in step S102. The process routine in FIG. 7 is a procedure of an operation included in the process of the information processing program 25P stored on the image forming apparatus 2.

In the private print job determination process in FIG. 7, the CPU 20A acquires the ID of the user authenticated in step S100 by retrieving the ID temporarily stored in step S120. In step S122, the CPU 20A searches for the print job linked with the acquired ID from among print jobs stored on the private print server 8.

In step S124, the CPU 20A determines in response to the search results in step S122 whether the print job responsive to the print instruction of the authenticated user is stored on the private print server 8. If the print job linked with the retrieved ID is found among the print jobs stored on the private print server 8, the yes path is followed in step S124 and the process routine proceeds to step S126.

In step S126, the CPU 20A determines that the print job linked with the authenticated user is present on the private print server 8 (presence of the print job) and the process routine ends.

If the search results in step S122 indicate no print job, the no path is followed in step S124 and the process routine proceeds to step S128.

In step S128, the CPU 20A determines that the print job linked with the authenticated user is not present on the private print server 8 (absence of the print job) and the process routine ends.

When the private print job determination process ends, the CPU 20A determines in step S104 in FIG. 6 in response to the results of the private print job determination process whether the print job responsive to the print instruction of the authorized user is stored on the private print server 8. Specifically, if the results of the private print job determination process indicate the presence of the print job, the CPU 20A follows the yes path in step S104, and proceeds to step S106. If the results of the private print job determination process indicate the absence of the print job, the CPU 20A follows the no path in step S104 and proceeds to step S112.

In step S106, the CPU 20A performs the user authentication via the second authentication process different from the first authentication process. Specifically, the user authentication is performed via the second authentication process, namely, the face authentication, different from the first authentication process. The authentication information used to authenticate the user is acquired by the camera 27. Specifically, the face of the user is photographed and the biometric information indicating the feature points of the face and the feature lines connected the feature points are extracted as the authentication information from the photograph of the face. The extracted authentication information is checked against the pre-registered reference authentication information to perform the user authentication via the face authentication. A determination as to whether the authentication is successful or unsuccessful is thus determined. If the acquired authentication information matches the reference authentication information, the authentication is determined to be successful. If the acquired authentication information fails to match the reference authentication information, the authentication is determined to be unsuccessful.

In step S108, the CPU 20A determines in response to the face authentication results in step S106 whether the authentication is successful. If the authentication is successful, the process routine proceeds to step S110. If the authentication is unsuccessful, the process routine proceeds to step S112.

In step S110, the CPU 20A performs control to display the private print jobs on the UI unit 24 in a manner that allows the user to select one from the private print jobs. In step S110, the CPU 20A waits on standby until an instruction of the user of the UI unit 24 to shift to the next step with a print job selected or not selected is provided. When the user instruction is received, the process routine proceeds to step S112.

If the print job linked with the authenticated user is present on the private print server 8, the user authentication is performed via the second authentication process different from the first authentication process. If the user authentication is successful via the second authentication process, the private print job is displayed. The workload on the user may be reduced and security may be secured in comparison with when the print job stored on the private print server 8 is constantly displayed.

Operations in steps S102 through S108 are an example of functions of the first authenticator 200, second authenticator 202, and determiner 206 illustrated in FIG. 3. The operation in step S110 is an example of the function of the display controller 208 in FIG. 3.

In step S112, the CPU 20A performs a public print job determination process. Specifically, the CPU 20A determines whether a print job linked with the user authenticated in step S100 is stored on the public print server 4.

Figure 8:
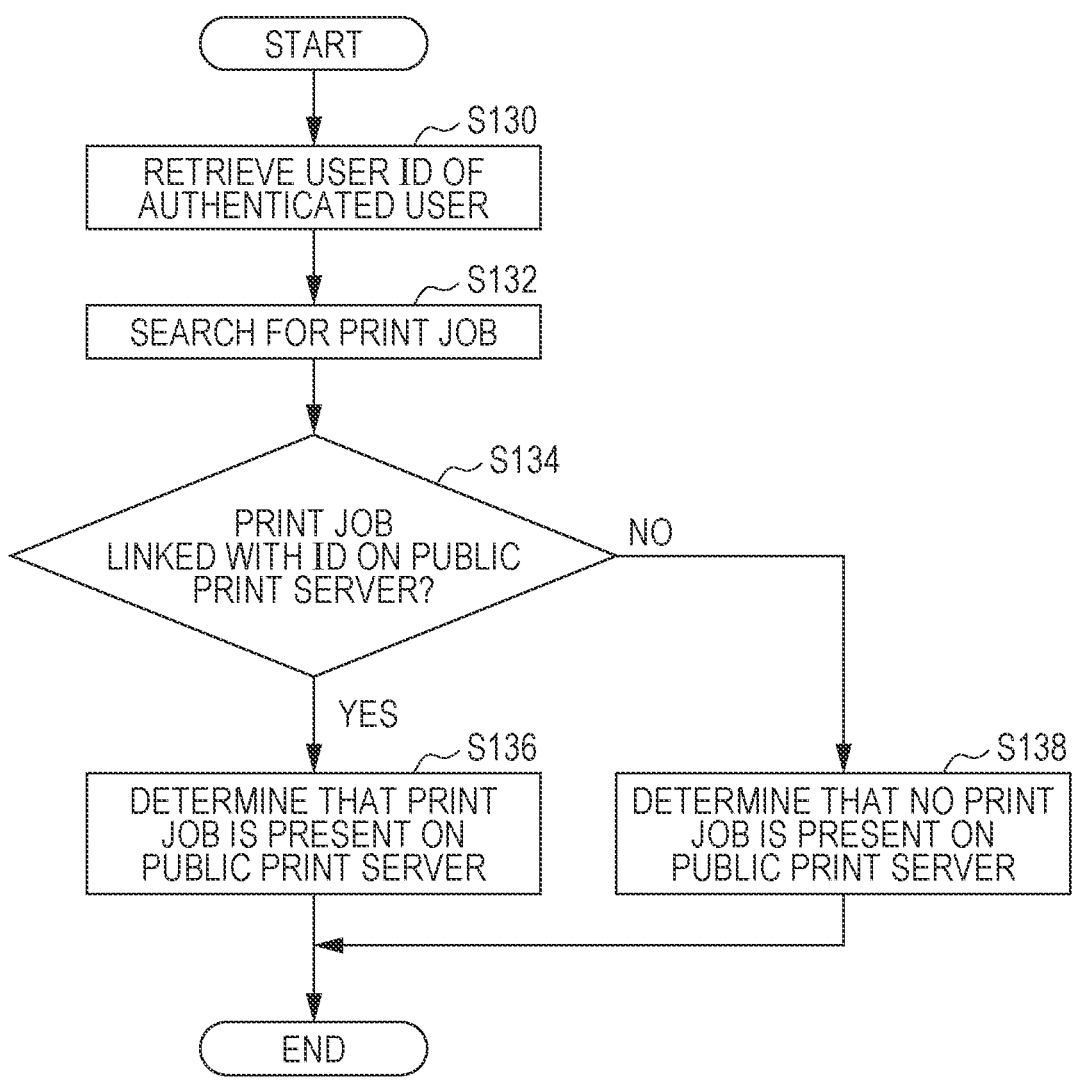
FIG. 8 is a flowchart illustrating an example of a public print job determination process of the exemplary embodiment.

FIG. 8 is a flowchart illustrating the public print job determination process performed in step S112. The process routine in FIG. 8 is a procedure of an operation included in the process of the information processing program 2SP stored on the image forming apparatus 2.

Referring to FIG. 8, the CPU 20A reads the temporarily stored ID in step S130 in the public print job determination process. The CPU 20A thus retrieves the ID of the user who has been authenticated in step S100. In step S132, the CPU 20A searches for the print job linked with the acquired ID from among print jobs stored on the public print server 4.

In step S134, the CPU 20A determines in response to search results in the operation in step S132 whether the print job responsive to the print instruction of the authenticated user stored on the public print server 4. If the print job linked with the acquired ID is found among the print jobs stored on the public print server 4, the yes path is followed in step S134 and the process routine proceeds to step S136.

In step S136, the CPU 20A determines that the print job linked with the authenticated user is present or the public print server 4 (presence of the print job) and ends the process routine.

If the search results in step S132 indicate the absence of the print job, the no path is followed in step S134 and the process routine proceeds to step S138.

In step S138, the CPU 20A determines that the print job linked with the authenticated user is not present on the public print server 4 (absence print job) and ends the process routine.

At the end of the public print job determination process, the CPU 20A determines in response to the results of the public print job determination process in step S114 in FIG. 6 whether the print job responsive to the print instruction of the authenticated user is present on the public print server 4.

Specifically, if the results of the public print job determination process indicate the presence of the print job, the CPU 20A follows the yes path in step S114 and then proceeds to step S116. If the results of the public print job determination process indicate the absence of the print job, the CPU 20A follows the no path in step S114 and then proceeds to step S118.

In step S116, the CPU 20A performs control to display the public print jobs on the UI unit 24 in a manner that allows the user to select one from the public print jobs. In step S116, the CPU 20A waits on standby until an instruction of the user of the UI unit 24 to shift to the next step with a print job selected or not selected is provided. When the user instruction is provided, the process routine proceeds to step S118.

In step S118, the CPU 20A performs the print jobs selected in steps S110 and S116 and then ends the process routine. The operation in step S118 is an example of the function of the job controller 210 in FIG. 3.

According to the first exemplary embodiment, as previously described, if a print job linked with the authenticated user is present on the private print server 8, the user authentication is additionally performed via the second authentication process different from the first authentication process. Only if the user authentication has been successful via the second authentication process, the private print job is displayed with security secured. If a print job linked with the authenticated user not present on the private print server 8, the additional user authentication is not performed, possibly leading to a reduced workload on the user. The workload on the user may be reduced and security may be secured in comparison with when the print job stored on the private print server 8 is constantly displayed.

Second Exemplary Embodiment

Second exemplary embodiment is described below. The second exemplary embodiment is identical in configuration to the first exemplary embodiment. Like elements are designated with like reference numerals and the discussion thereof are omitted as appropriate.

According to the first exemplary embodiment, if a print job linked with the user is present on the private print server 8, the user authentication is additionally performed via the second authentication process different from the first authentication process. If a print job linked with the user is not present on the private print server 8, the additional user authentication is not performed.

However, even though the additional user authentication is not performed with no print job present on the private print server 8, the user may perform the image processing function, such as an image reading function, on the image forming apparatus 2. In such a case, the user may provide an instruction to transmit scan data resulting from scanning a document as an image to a user terminal as an external device outside of the image forming apparatus 2. If the scan data is transmitted without paying attention to whether the transmission destination of the scan data is the private network 9 or the public network 6, security may be difficult to secure.

The second exemplary embodiment relates to an information processing apparatus that may secure security even when the additional user authentication is not performed and the user performs the image processing function on the image forming apparatus 2.

The process of the image forming apparatus 2 of the second exemplary embodiment is described with reference to FIG. 9.

Figure 9:
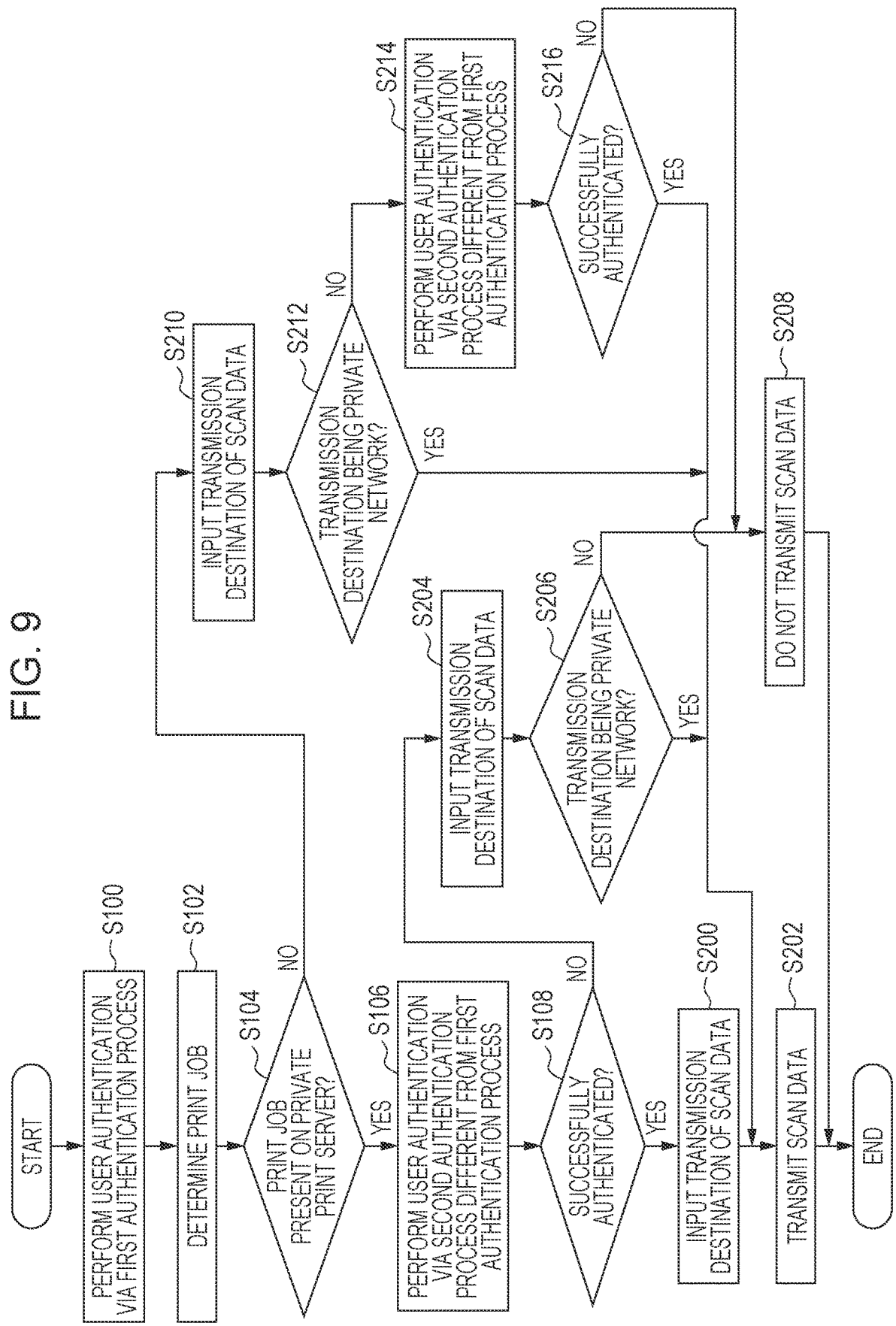
FIG. 9 is a flowchart illustrating an information processing example performed by the image forming apparatus of another exemplary embodiment.

FIG. 9 is a flowchart illustrating a process of an information processing program of the second exemplary embodiment. The information processing program of the second exemplary embodiment is a process example that performs an image reading function on the image forming apparatus 2.

The information processing program in FIG. 9 may be executed in place of the information processing program 25P in FIG. 6 or part of the information processing program in FIG. 9 may be added to the information processing program 25P in FIG. 6 in execution.

When an instruction to perform the image reading function is input to the image forming apparatus 2, the process routine in FIG. 9 is performed.

In step S100, the CPU 20A performs the user authentication (card authentication) via the first authentication process. In step S102, the CPU 20A performs the private print job determination process to determine whether the print job linked with the authenticated user is stored on the private print server 8 (see FIG. 7).

In step S104, the CPU 20A determines in response to the results of the private print job determination process whether the print job linked with the authenticated user is stored on the private print server 8. If the results of the private print job determination indicates the presence of the print job, the yes path is followed in step S104 and the process routine proceeds to step S106. If the results of the private print job determination indicates the absence of the print job, the no path is followed in step S104 and the process routine proceeds to step S210.

In step S106, the CPU 20A performs the user authentication (for example, the face authentication) via the second authentication process different from the first authentication process. In step S108, the CPU 20A determines in response to authentication results of the face authentication in step S106 whether the authentication has been successful. If the authentication has been successful, the process routine proceeds to step S200. If the authentication has been unsuccessful, the process routine proceeds to step S204.

In step S200, the CPU 20A performs display control in a manner such that the transmission destination of the scan data as part of a scan job is inputtable on the UI unit 24. In step S202, the CPU 20A performs control to read a document by performing the image reading function, temporarily store on the image forming apparatus 2 the scan data obtained by reading the document, and transmit the scan data to the input transmission destination. The CPU 20A thus completes the process routine.

If the no path followed in step S108, the CPU 20A performs display control in step S204 in a manner such that the transmission destination of the scan data inputtable on the UI unit 24. In step S206, the CPU 20A determines whether the input transmission destination is the user terminal 7A or the user terminal 7B via the private network 9. If the yes path is followed in step S206, the CPU 20A ends in step S202 the process routine by performing control to transmit the scan data to the input transmission destination. The transmission destination via the private network 9 is higher in security level than the transmission destination via the public network 6 and security is thus considered to be secure. If the yes path is followed in step S206, the additional authentication may be further performed.

If the no path is followed in step S206, the CPU 20A does not perform the transmission of the scan data and ends the process routine without transmitting the scan data in step S208.

If the results of the print job determination indicate the absence of the print job, the CPU 20A follows the no path in step S104 and performs display control in step S210 in a manner such that the transmission destination of the scan data is inputtable on the UI unit 24. In step S212, the CPU 20A determines whether the input transmission destination is the user terminal 7A or 7B via the private network 9. If the yes path is followed in step S212, the process routine proceeds to step S202. If the no path is followed in step S212, the process routine proceeds to step S214.

In a way similar to step S106, the CPU 20A performs in step S214 the user authentication via the second authentication process (for example, the face authentication) different from the first authentication process. In step S216, the CPU 20A determines in response to the authentication results of the face authentication in step S106 whether the authentication has been successful. If the authentication has been successful, the process routine proceeds to step S202. If the authentication has been unsuccessful, the process routine proceeds to step S208.

As described above, when the image reading function is performed on the image forming apparatus 2 with no print on the private print server 8, the additional authentication is performed via the second authentication process different from the first authentication process. If the authentication has been successful, the transmission of the scan data to the transmission destination via the public network 6 or the private network 9 is enabled (scan job). If the authentication has been unsuccessful, only the scan job to the transmission destination via the private network 9 is enabled.

If the authentication has been successful with the print job present on the private print server 8, the transmission of the scan data to the transmission destination via the public network 6 or the private network 9 is enabled (scan job).

If the authentication has been unsuccessful with the print job present on the private print server 8, the transmission of the scan data only to the transmission destination via the private network 9 is enabled.

When the user continuously performs the image processing function (scan) on the image forming apparatus 2, the workload on the user may be reduced and security may be secured regardless of the presence or absence of the print job on the private print server 8.

The information processing apparatus of the exemplary embodiments has been described. The exemplary embodiments may be implemented as a program causing a computer to perform the functions of the elements in the information processing apparatus. The exemplary embodiments may be implemented as a non-transitory computer readable medium having stored the program.

The configuration of the information processing apparatus described with reference to the exemplary embodiments has been described for exemplary purposes only and may be modified without departing from the scope of the disclosure.

The processes of the program described above has been described for exemplary purposes only. Without departing from the scope of the disclosure, a step may be deleted or added or the order of steps may be changed.

According to the exemplary embodiments, the processes of the exemplary embodiments are implemented by a software configuration when the program runs on the computer. The disclosure is not limited to this. For example, the exemplary embodiments may be implemented by a hardware configuration, software configuration, or a combination thereof.

In the embodiments above, the term "processor" refers to hardware in a broad sense. Examples of the processor include general processors (e.g., CPU: Central Processing Unit)) and dedicated processors (e.g., GPU: Graphics Processing Unit, ASIC: Application Specific Integrated Circuit, FPGA: Field. Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
    perform a first authentication process to authenticate a user,
    in response to the user being successfully authenticated via the first authentication process, determine whether any job associated with the user authenticated via the first authentication process is stored on a second accumulator having a higher security level than a first accumulator,
    in response to a plurality of jobs determined to be stored on the second accumulator, perform as an additional authentication process as a second authentication process different from the first authentication process,
    in response to the user being successfully authenticated via the second authentication process, display the plurality of jobs stored on the second accumulator on a user interface to allow the user to view the plurality of jobs stored on the second accumulator, and
    in response to the user being unsuccessfully authenticated via the second authentication process, not display any of the plurality of jobs stored on the second accumulator on the user interface to prohibit the user from viewing any of the plurality of jobs stored on the second accumulator.

2. The information processing apparatus according to claim 1, wherein the first accumulator performs job storage via a first network set at a first security level and the second accumulator performs job storage via a second network set at a second security level higher than the first security level.

3. The information processing apparatus according to claim 2, wherein the processor is configured to be free from performing the additional authentication process if no job is stored on the second accumulator.

4. The information processing apparatus according to claim 3, wherein the plurality of jobs are print jobs.

5. The information processing apparatus according to claim 2, wherein the plurality of jobs are print jobs.

6. The information processing apparatus according to claim 2, wherein the processor is configured to, even though the additional authentication process is set not to be performed, perform the additional authentication process as long as a second job different from the plurality of jobs that transmits data via the first network is to be performed.

7. The information processing apparatus according to claim 6, wherein the second job is a scan job.

8. The information processing apparatus according to claim 7, wherein the scan job includes information indicating a transmission destination to which the data is transmitted via the first network.

9. The information processing apparatus according to claim 1, wherein the processor is configured to be free from performing the additional authentication process if no job is stored on the second accumulator.

10. The information processing apparatus according to claim 9, wherein the plurality of jobs are print jobs.

11. The information processing apparatus according to claim 1, wherein the plurality of jobs are print jobs.

12. The information processing apparatus according to claim 1, wherein the processor is further configured to:
    in response to a first job among the plurality of jobs displayed on the user interface being selected by the user, and in response to a first instruction being instructed by the user, perform execution corresponding to the first instruction on the first job.

13. The information processing apparatus according to claim 1, wherein the processor is configured to:
    in response to the first authentication process being unsuccessful, not allow the user to use the information processing apparatus; and
    in response to the first authentication process being successful, identify the user authenticated via the first authentication process.

14. The information processing apparatus according to claim 1, wherein the processor is further configured to:
    in response to no job associated with the user authenticated via the determined to be stored on the second accumulator, determine whether any job associated with the user authenticated is stored on the first accumulator; and
    in response to a plurality of other jobs determined to be stored on first accumulator, display the plurality of other jobs on the user interface to the user for selection.

15. The information processing apparatus according to claim 1,
    wherein the first authentication process is a non-biometric authentication process, and wherein the second authentication process is a biometric authentication process.

16. The information processing apparatus according to claim 1, wherein the processor is configured to:
    retrieve an identification (ID) of the user after the user is authenticated via the first authentication; and
    search for the plurality of jobs stored on the second accumulator by using the ID of the user.

17. An information processing apparatus comprising:
    means for performing a first authentication process to authenticate a user,
    means for, in response to the user being successfully authenticated via the first authentication process, determining whether any job associated with the user authenticated via the first authentication process is stored on a second accumulator having a higher security level than a first accumulator,
    means for, in response to a plurality of jobs determined to be stored on the second accumulator, performing as an additional authentication process as a second authentication process different from the first authentication process, and means for, in response to the user being successfully authenticated via the second authentication process, displaying the plurality of jobs stored on the second accumulator on a user interface to allow the user to view the plurality of jobs stored on the second accumulator, and means for, in response to the user being unsuccessfully authenticated via the second authentication process, not displaying any of the plurality of jobs stored on the second accumulator on the user interface to prohibit the user from viewing any of the plurality of jobs stored on the second accumulator.

18. A non-transitory computer readable medium storing a program causing a computer to execute a process for processing information, the process comprising:

performing a first authentication process to authenticate a user, in response to the user being successfully authenticated via the first authentication process, determining whether any job associated with the user authenticated via the first authentication process is stored on a second accumulator having a higher security level than a first accumulator, in response to a plurality of jobs determined to be stored on the second accumulator, performing as an additional authentication process as a second authentication process different from the first authentication process, and in response to the user being successfully authenticated via the second authentication process, displaying the plurality of jobs stored on the second accumulator on a user interface to allow the user to view the plurality of jobs stored on the second accumulator, and in response to the user being unsuccessfully authenticated via the second authentication process, not displaying any of the plurality of jobs stored on the second accumulator on the user interface to prohibit the user from viewing any of the plurality of jobs stored on the second accumulator.

* * * * *